(12) United States Patent
Klocke et al.

(10) Patent No.: US 6,811,195 B2
(45) Date of Patent: Nov. 2, 2004

(54) COMPOSITE STRUCTURAL ARTICLE FOR FRAME STRUCTURES

(75) Inventors: Martin Klocke, Köln (DE); Boris Koch, Wermelskirchen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 112 days.

(21) Appl. No.: 10/264,357

(22) Filed: Oct. 4, 2002

(65) Prior Publication Data

US 2003/0070387 A1 Apr. 17, 2003

(30) Foreign Application Priority Data

Oct. 8, 2001 (DE) .......................................... 101 49 522

(51) Int. Cl.[7] .......................... B62D 27/02; B62D 29/04
(52) U.S. Cl. ..................... 296/29; 296/203.01; 52/309.4
(58) Field of Search .............. 296/29, 203.01, 296/187.02, 193.01, 193.06, 205; 52/309.4

(56) References Cited

U.S. PATENT DOCUMENTS

| | | | |
|---|---|---|---|
| 3,746,387 A | | 7/1973 | Schwenk |
| 5,059,056 A | * | 10/1991 | Banthia et al. ............. 403/170 |
| 5,190,803 A | | 3/1993 | Goldbach et al. |
| 5,318,819 A | * | 6/1994 | Pai ............................. 428/71 |
| 5,842,265 A | | 12/1998 | Rink |
| 5,940,949 A | | 8/1999 | Rink |
| 6,354,623 B1 | * | 3/2002 | Delmastro .................. 280/732 |
| 6,458,451 B1 | * | 10/2002 | Steidl et al. ............. 428/308.4 |
| 6,497,782 B1 | * | 12/2002 | Platz et al. ................. 156/245 |

FOREIGN PATENT DOCUMENTS

| | | |
|---|---|---|
| EP | 0 995 668 | 4/2000 |
| FR | 2 796 611 | 1/2001 |
| FR | 2 803 262 | 7/2001 |
| GB | 2 196 584 | 8/1987 |
| WO | 01/32496 | 5/2001 |

* cited by examiner

*Primary Examiner*—D. Glenn Dayoan
*Assistant Examiner*—Greg Blankenship
(74) *Attorney, Agent, or Firm*—Godfried R. Akorli; Diderico van Eyl; Jill Denesvich

(57) ABSTRACT

A composite structural article, of preferably metal and thermoplastic material is described. The composite structural article comprises: (a) at least one reinforcing element (2) having sized openings (20); and (b) at least three profiled sections (1, 3, 4). A portion of each profiled section (1, 3, 4) is connected interlockingly with a portion of the reinforcing element (2). At least two of the profiled sections (1, 3, 4) have terminal portions each having a projecting region (5) that engages interlockingly with the sized openings (20) of the reinforcing element (2), such that a portion of the reinforcing element (2) surrounds at least partially the projecting regions (5). The profiled sections (1, 3, 4) are further joined to the reinforcing element (2) by means of thermoplastic material (11, 13) injected in the region of each interlocking connection with the reinforcing element (2). In addition, one of the profiled sections (3) is in at least one of: (i) an abutting relationship with at least two of the profiled sections (1, 4); and (ii) an interlocking relationship with at least two of said profiled sections (1, 4). Articles that may comprise the composite structural article of the present invention include, for example, motorized vehicles, electronics articles and domestic appliances.

18 Claims, 10 Drawing Sheets

COMPOSITE STRUCTURAL ARTICLE FOR FRAME STRUCTURES

CROSS REFERENCE TO RELATED PATENT APPLICATION

The present patent application claims the right of priority under 35 U.S.C. §119 (a)–(d) of German Patent Application No. 101 49 522.6, filed Oct. 8, 2001.

FIELD OF THE INVENTION

The present invention relates to a plastics-metal composite structural part and its use for frame structures. The invention relates in particular to a composite structural part produced by assembling profiled sections formed from high strength and high rigidity composite structural parts, in particular in a plastics-metal hybrid construction, in which the assembly of the profiled sections and the production of the composite structural parts is achieved simultaneously by the forming and shaping of thermoplastics moulding compositions. In the process, composite structural parts are produced having high strength and high rigidity components (e.g., of steel or composites) that are assembled with the aid of a thermoplastic material, and are additionally held in position and supported in shape by ribs or solid walls.

BACKGROUND OF THE INVENTION

High strength joints of high load-bearing supporting members, profiled sections, sheets, etc. are often used in the manufacture of automobiles or machinery. In this connection supporting members of steel or aluminium are predominantly used that are welded or bonded to one another in the joining regions. To provide further stiffening of the joining sites, hereinafter also termed nodal points, cross-struts are typically integrated in the structure, or cast joints, for example of aluminium die castings, are employed. A further possibility is the use of semi-finished products consisting of composites (plastics material reinforced with long glass fibres), which are generally joined to one another. These semi-finished composites are generally joined to one another by forming laminates with joint elements that likewise consist of composites.

These procedures conventionally used in practice have the disadvantage that the assembly processes are time-consuming and permit only a limited dimensional accuracy and reproducibility in mass production runs. If cross-struts are used to provide additional stiffening of the joint elements, these generally must be thick-walled (1 to 3 mm) in order to prevent a mechanical failure due to bulging or buckling. Typical wall thickness' of metal sheets used in the automobile industry are 0.7 to 1.2 mm in car production, and 0.7 mm to 3 mm in motor scooter production. This increases the weight of the structural part, which is contrary to the wishes of the manufacturer, particularly in vehicle production.

SUMMARY OF THE INVENTION

The object of the present invention is accordingly to provide a composite structural part having nodal points of the type mentioned in the background section that permits the high strength and high rigidity joining of supporting members and sheets as well as an economic assembly of semi-finished products and structural part components into structural parts. Also the fabrication of the joint elements should be accomplished with a high dimensional accuracy and reproducibility. A particular object is to arrange the profiled sections in the injection moulding tool so that they can be reinforced with plastics material in the tool by simple slide operations and then easily removed from the tool. The process for producing frame constructions for widely differing applications should thereby be simplified.

This object is achieved according to the invention in that reinforcing elements of high strength materials are used for joining the profiled sections and for stiffening the composite structural parts, the said elements being arranged in an interlocking manner in the joint region (connection site of the profiled sections). The joint region is then provided with a thermoplastic material that holds all the individual parts together and prevents a premature bulging or buckling of the high strength individual parts in the joint region. This object is furthermore achieved according to the invention in that at least two profiled sections have projecting regions at their ends that are surrounded by the reinforcing element.

In accordance with the present invention, there is provided a composite structural article comprising:

(a) at least one reinforcing element (2) having sized openings (20); and (b) at least three profiled sections (1, 3, 4), wherein, a portion of each profiled section is connected interlockingly with a portion of said reinforcing element (2), at least two of said profiled sections have terminal portions each having a projecting region (5) that engages interlockingly with the sized openings of said reinforcing element (2) such that a portion of said reinforcing element (2) surrounds at least partially said projecting regions (5), said profiled sections being further joined to said reinforcing element (2) by means of thermoplastic material (11, 13) injected in the region of each interlocking connection with said reinforcing element (2), and one of said profiled sections (3) is in at least one of (i) an abutting relationship with at least two of said profiled sections (1, 4), and (ii) an interlocking relationship with at least two of said profiled sections (1, 4).

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc, used in the specification and claims are to be under stood as modified in all instances by the term "about."

BRIEF DESCRIPTION OF THE DRAWING FIGURES

Figure 9:
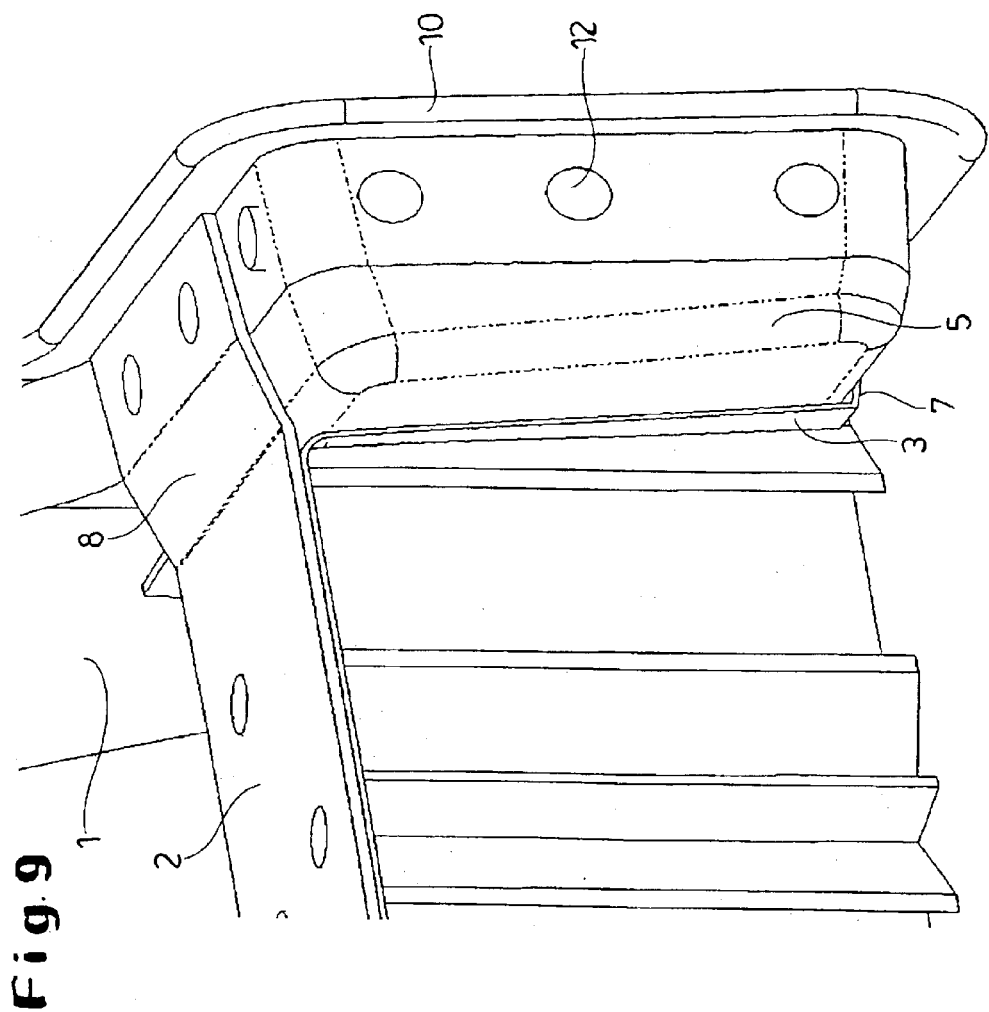
Figure 10:
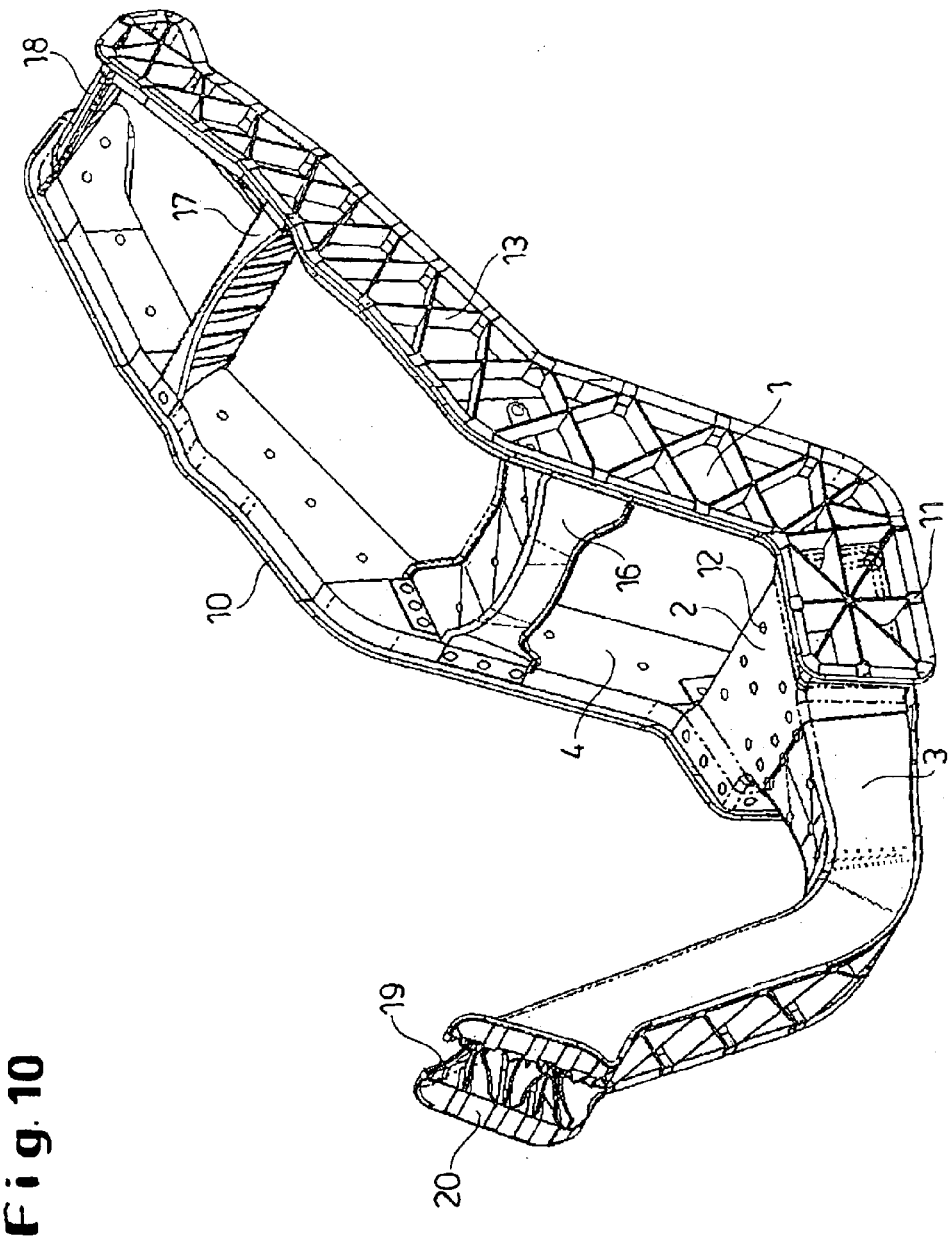

FIG. 9 is a sectional representation of the contact between the profiled sections (1, 4, 3) as well as the reinforcing element (2); and FIG. 10 shows an assembly of several profiled sections (1, 2, 3, 4, and 16, 16, 18) using the composite structural part described comprising gusset element (1, 2, 3, 4 and 13) and additional profiled sections (16, 17, 18) to from a frame structure of a motor scooter using plastic rivets injected-through openings (12), injection-molded encapsulated profiled edges (10) on the edges of the profiled sections and rib wraparounds (11) on the profiled sections.

In FIGS. 1–10, like reference numerals designate the same components and structural features.

DETAILED DESCRIPTION OF THE INVENTION

Profiled sections (e.g., 1, 3, 4) within the context of the present invention are profiled sections that are open or closed independently of one another (in particular open profiled sections) of plastics material or metal, preferably metal, particularly preferably of steel, aluminium or magnesium and of any arbitrary cross-section. Open U-shaped profiled sections or cap-shaped profiled sections that are partly closed at their end are preferred. The profiled sections preferably have a wall thickness of 0.3 to 3 mm, particularly preferably 0.5 to 2.5 mm.

The reinforcing elements (e.g., 2) are employed as high strength connecting components in the form of for example clamps, semimonocoque structures or other profiled sections (including additional brackets and edge sections) that are adapted to the shape of the profiled sections and structural part components to be assembled and are additionally supported with respect to one another particularly by means of cross-struts and/or preferably by further supporting profiled sections. They are placed around the profiled sections and other structural part components to be assembled. The reinforcing elements serve to reinforce and stiffen the connection site and are designed so as to form the interlocking connection with the profiled sections and structural part components to be assembled.

The reinforcing element preferably consists of metal, in particular steel, aluminium or magnesium, of ceramics material or high-strength plastics material, in particular thermosetting materials or plastics materials reinforced with long fibres or plastics materials reinforced with industrial textiles.

Particularly preferably the reinforcing element is formed as a semimonocoque structure.

To provide special reinforcement of the composite, the reinforcing element is preferably provided with additional supporting walls.

The composite structural part is particularly stable if, in a preferred modification, the projecting regions of the profiled sections make area contact with the further profiled sections adjoining them.

The stability of the composite structural part may be increased still further if the profiled sections have independently of one another an extra reinforcing edge (e.g., 7).

In a further preferred modification of the invention the profiled sections and the reinforcing element independently of one another have edges that are sheathed with a thermoplastic material.

A preferred composite structural part is designed so that the profiled sections are arranged in one plane in the region of their connection site.

In this way stable structures with profiled sections are obtained, in which an individual supporting member transforms into two supporting members joined laterally to the said supporting member, and a light but nevertheless high-strength rigid joint can be achieved in the composite.

The composite structural part may be expanded by arbitrary (or additional) structural elements depending on the intended application. A composite structural part is preferred in which further structural elements of plastics material are injected at the profiled sections, in particular structural elements selected from the group comprising shells, reinforcing stays, snap-action hooks, (trough-shaped) cable conduits, recesses for other snap-action hooks or releasable connections, supports for insertable stays or boards or metal sheets, sumps, in particular the lower half of a fuel tank or the lower half of an oil reservoir, and shells for helmet stands and/or storage spaces and for structural parts of vehicle bodies and wheelcaps.

The composite structural part is particularly strong if, in an alternative preferred construction, the reinforcing element is formed in one piece in the region of the connection site and is provided with a profiled section, where the profiled sections are pushed or inserted into the reinforcing element before spraying (or injecting) with the thermoplastic material.

The stability of the composite structural part may be increased in a further preferred modification if openings or holes (or perforations) having edges, are made in the profiled sections and/or in the reinforcing element at superimposed positions of the profiled sections and reinforcing element, through which openings or holes the thermoplastic material projects and on which the thermoplastic material is anchored. Preferably the openings or holes or perforations have deformed edge portions, e.g., they are provided with indents, flanges, etc.

The stability of the composite structural part may also be improved in yet a further preferred embodiment if specially shaped regions (such as indentations), in particular beads or crimps, to which the thermoplastic material is anchored, are provided in the profiled sections and/or the reinforcing element at superimposed positions of the said profiled sections and reinforcing element.

Preferably a non-reinforced or reinforced or filled plastics material serves as thermoplastic material, preferably based on polyamide (PA), polyester, in particular polyethylene terephthalate (PET), polybutylene terephthalate (PBT), polyolefin, in particular polypropylene (PP), polyethylene (PE), styrene-acrylonitrile copolymers, in particular acrylonitrile-styrene-butadiene copolymers (ABS), polycarbonate (PC), polypropylene oxide (PPO), (PSO), polyphenylene sulfide (PPS), polyimide (PI), (PEE), polyketone, syndiotactic polystyrene (PS) or a possible mixture of these plastics materials.

A particular variant of the composite structural part is characterised in that the end of the reinforcing element is shaped so that it can accommodate the other profiled sections and the specially formed parts (projecting regions) at the ends. For injection moulding processes these ends are preferably provided with bevelled sections differing from the remaining profiled section.

A further improvement of the composite structural part further includes brackets (e.g. bevelled regions) at the end of the reinforcing element that rest against the other adjacent profiled sections and that are joined to the other profiled sections by superimposed openings, holes or bores (or perforations), optionally with indents, and by means of thermoplastic material injected therethrough and therein.

In a preferred further shape the central profiled section (3) has a profiled edge (7) that is formed so as to produce an additional interlocking connection from underneath with the two profiled sections surrounded by the reinforcing element.

The present invention also provides for the use of the composite structural part according to the invention as a construction element for machinery, vehicles and all types of structural parts, in particular for motorised vehicles, electronics articles, domestic appliances, building materials, motor scooters, treadle scooters, kickboards, motor cycles, bicycles, treadmobiles (such as chain-driven cars), shelving, cupboards, kitchen surfaces, washing machines, dryers, kitchen appliances (large mixers), copiers, printers, scanners, monitor stands, writing desk supports, computer housings, chairs, tennis racquets, stepladders, printer stands, seating in vehicles, transportation vehicles ("ants"), shopping buggies, cars, lorries, trailers, caravans, three-wheeled vehicles (motorised and non-motorised), wheelchairs, levers/handles and transverse control arms for vehicles.

The present invention also provides for the use of the composite structural part as a structural part for vehicles, in particular doors, bumpers, supporting members, front and rear parts for cars, door sill supporting frames, A pillars, B pillars, C pillars, space-frame parts, instrument panel supports, rear flap supports, roof frames, lorry frames, trailer frames, motor scooter frames and back seat arm rests.

The present invention moreover provides frames for motor scooters, treadle scooters, kickboards, motor cycles, bicycles, treadmobiles (such as chain-driven cars), shelving, cupboards, kitchen surfaces, washing machines, dryers, kitchen appliances (large mixers), copiers, printers, scanners, monitor stands, writing desk supports, computer housings, chairs, tennis racquets, stepladders, printer stands, seating in vehicles, transportation vehicles ("ants"), shopping buggies, cars, lorries, trailers, caravans, three-wheeled vehicles (motorised and non-motorised), wheelchairs, levers/handles and transverse control arms for vehicles comprising a composite structural part according to the invention.

The invention is described in more detail hereinafter with the aid of the drawings and by means of the examples, which however are not intended to restrict the invention.

EXAMPLE

Figure 1:
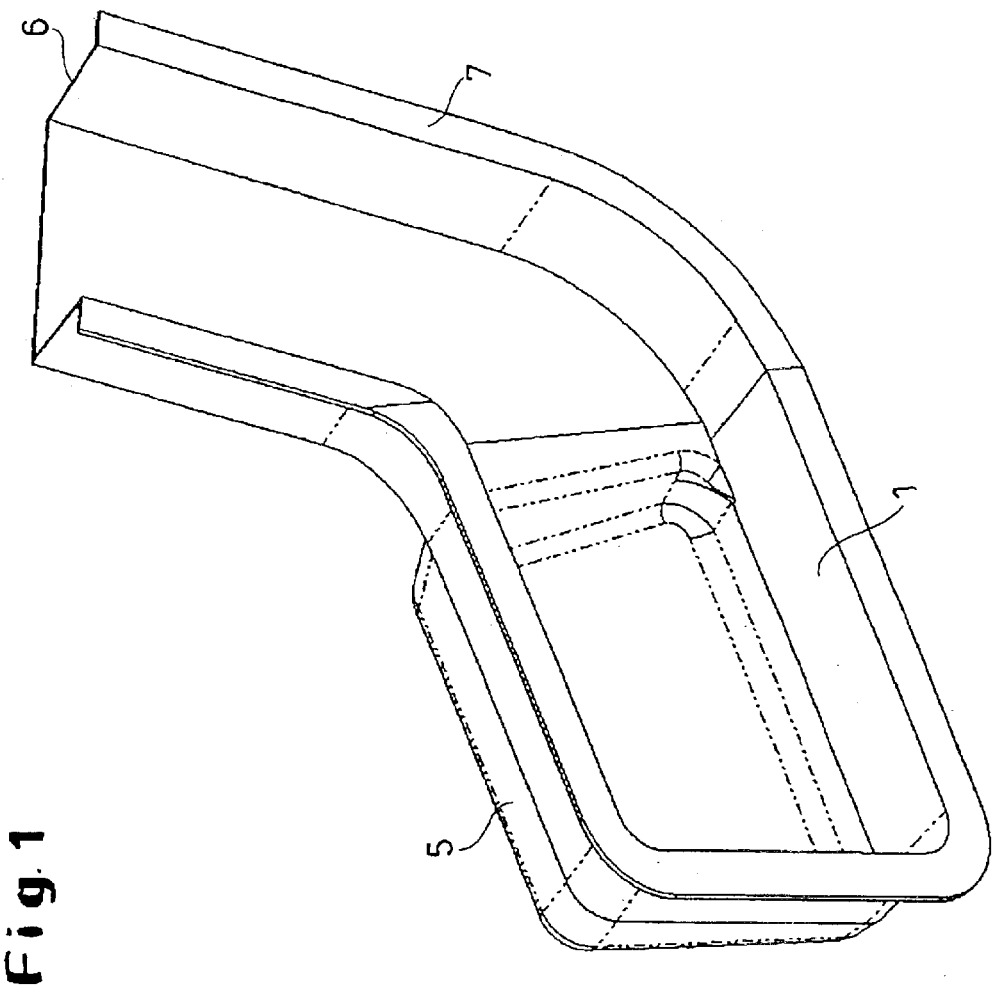
FIG. 1 is a representation of a profiled section (1) having an end-located projecting region (5), profiled (U-shaped) cross-section (6) and profiled edge (7)
Figure 2:
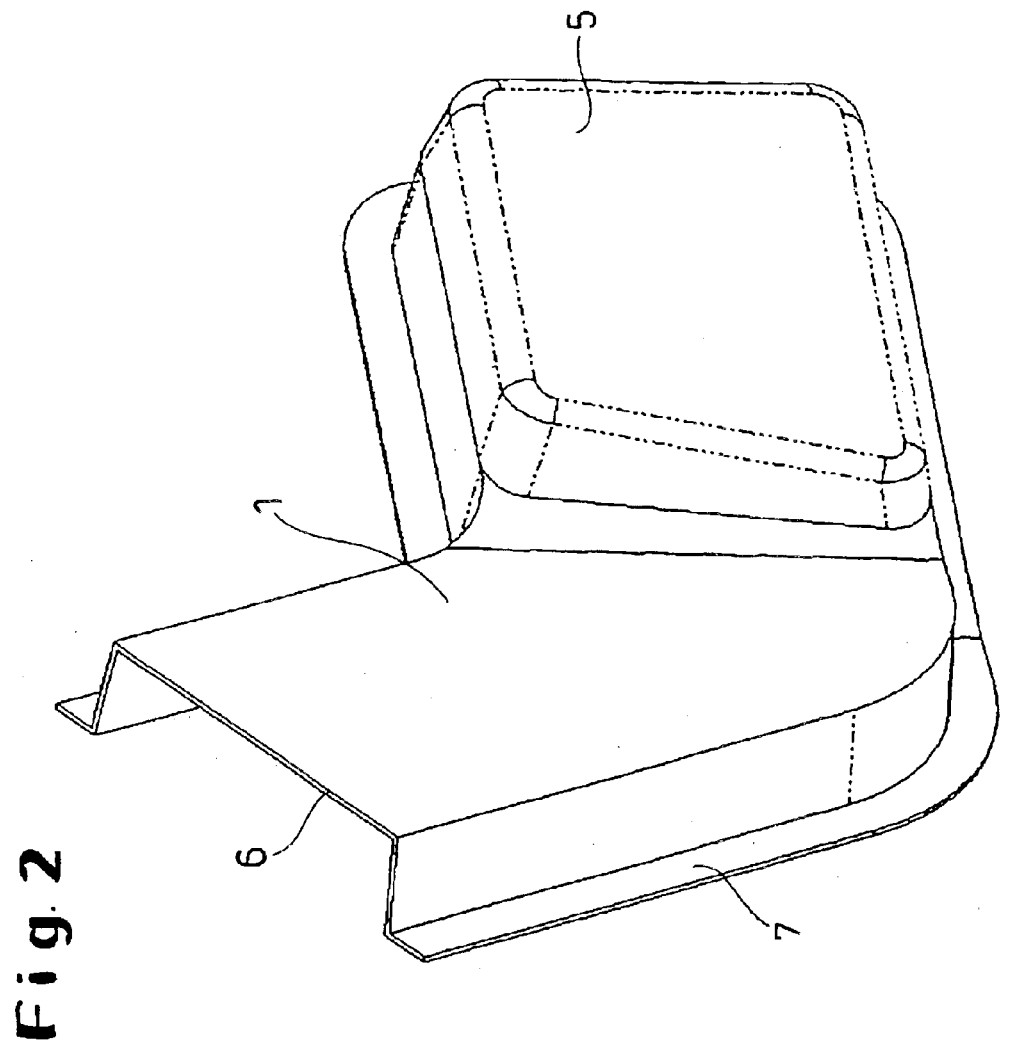
FIG. 2 is a representative rear view of profile section (1) of FIG. 1.
Figure 3:
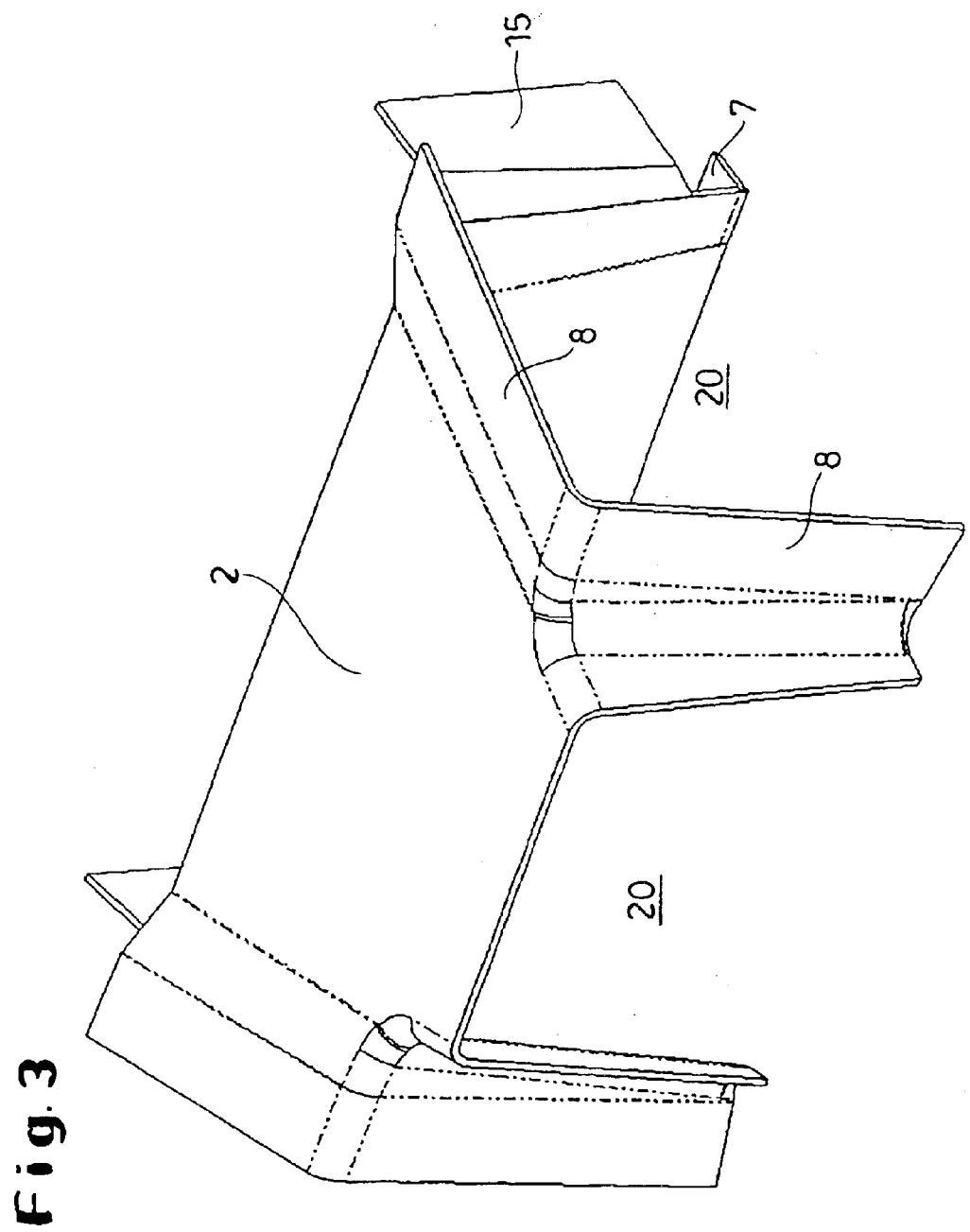
FIG. 3 is a representative perspective view of a reinforcing element (2) having a profiled edge (7), a bracket (15) and a shaped part (or portion) (8) at the profiled end.
Figure 4:
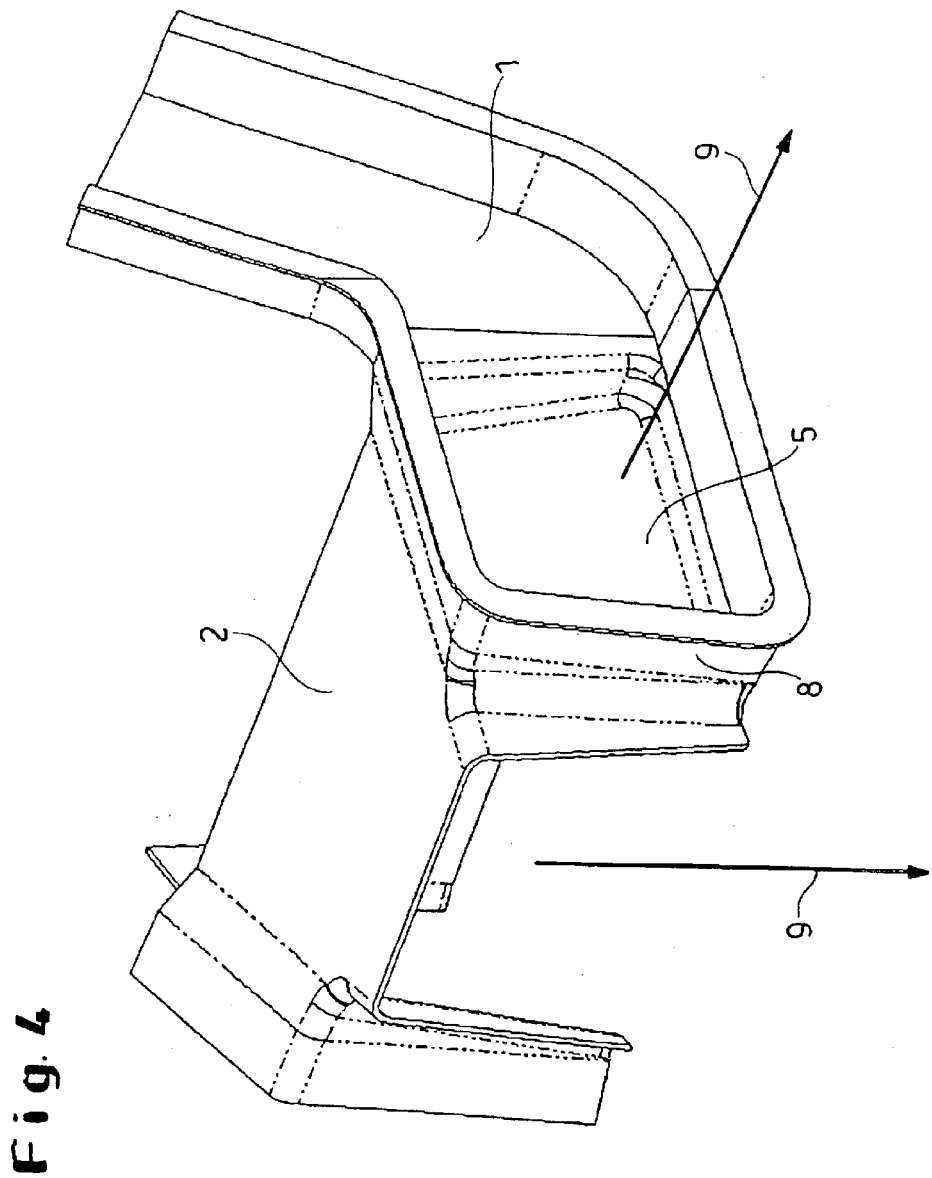
FIG. 4 is a representative perspective view of an assembly of reinforcing element (2) with profiled section (1), with intersection of the projecting region (5) with shaped part (8), and includes an illustration as to dismantling directions (9) of the profiled sections.

In a preferred embodiment of the present invention, the composite structural article is a plastics-metal composite structural part, in which a metal profiled section 1 is formed as a cap-shaped or U-shaped cross-section 6 (see FIG. 1) of steel sheet material (0.5 mm thick). At one end and/or at the joining position for the connection with the further profiled sections 3 and 4, the profiled section 1 is formed deeper than the rest of the profiled section 1. At this position a projecting region (5) (in the form of a "pot") that is deeper than the projecting section is introduced into the profiled section 1 (see FIG. 2). This projecting region 5 permits an interlocking connection over a large area with opening 20 of reinforcing element 2, which is a specially shaped metal profiled section (see FIG. 3), so as to form a relatively large installation surface and more connection points with the reinforcing element 2. The reinforcing element 2 has at the ends of the first profiled section exactly matching profiled edges 7, a bracket 15 and the shaped part 8, which together free the first profiled section 1 unilaterally. The profiled section 1 is set at about 90° (larger variations possible) in its longitudinal axis relative to the reinforcing element 2 in the region of the joint element, and may for example be inserted as a guide frame during use. In addition the opening direction of the profiled section 1 is rotated by about 90° relative to the reinforcing element 2 (see FIG. 4). Handling of the parts with tools is thereby possible also with frame structures that are more complex than those illustrated here. FIG. 4 shows the assembly of the reinforcing element 2 with the profiled section 1, with intersection of the projecting regions 5 and shaped part 8, and the dismantling direction 9 of the profiled sections 1 and 2.

Figure 5:
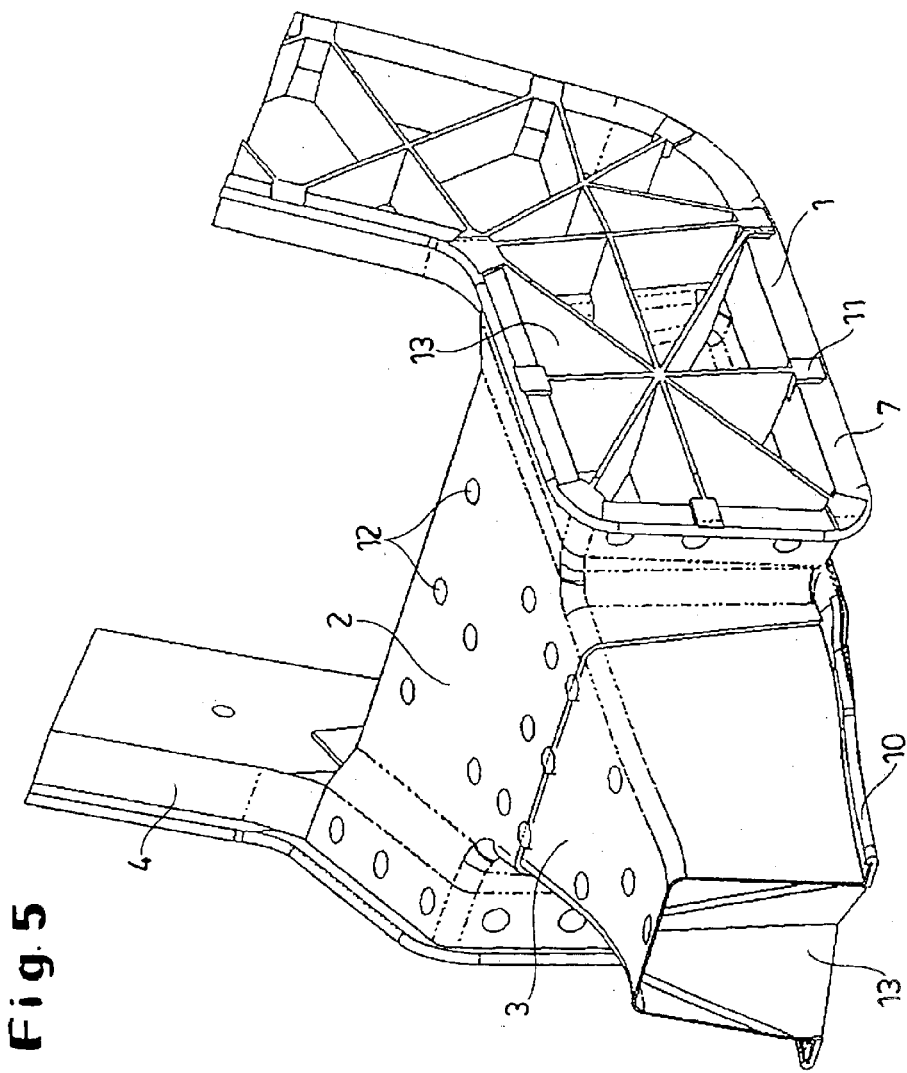
FIG. 5 is a representative perspective view of an assembly of the reinforcing element (2) with all profiled sections (1, 3 and 4) in the composite structural part with injected plastics material, in the form of ribs (13), injection-molded encapsulated profiled edge (10), plastics sprueless-injected part through opening (12), and rib wraparound (11) on the profiled edge (7)

FIG. 5 is a partial view showing the assembly of the reinforcing element 2 with the profiled section 1 and a mirror-image profiled section 4, as well as with a further U-shaped metal profiled section to form the composite structural part. With the help of injected thermoplastic material (glass fibre-reinforced polyamide) in the form of ribs 13, an injection moulded encapsulated profiled edge 10, a plastics sprueless injection at several superimposed openings 12 and a rib wraparound 11 on the profiled sections 1, 3, 4, these are joined to one another (and to reinforcing element 2) and are mechanically substantially reinforced.

Figure 6:
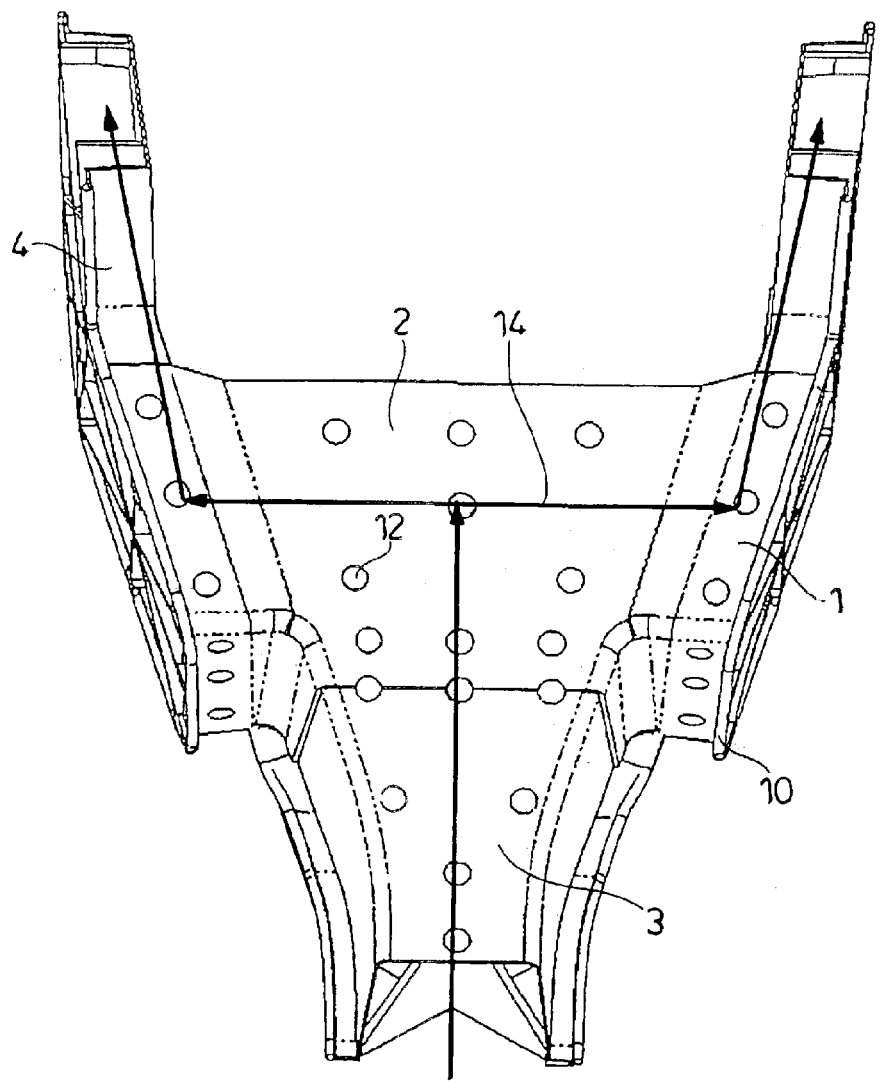
FIG. 6 is a representative perspective view of the composite structural part of FIG. 5 from above, which includes diagrammatically illustrated profiled section contour (14)

FIG. 6 shows another view, from above, of the composite structural part according to FIG. 5, with the diagrammatically illustrated profiled contour 14. The matching of the profiled sections 1, 3, 4 in the reinforcing element 2 and their connection to one another can clearly be seen once more.

Figure 7:
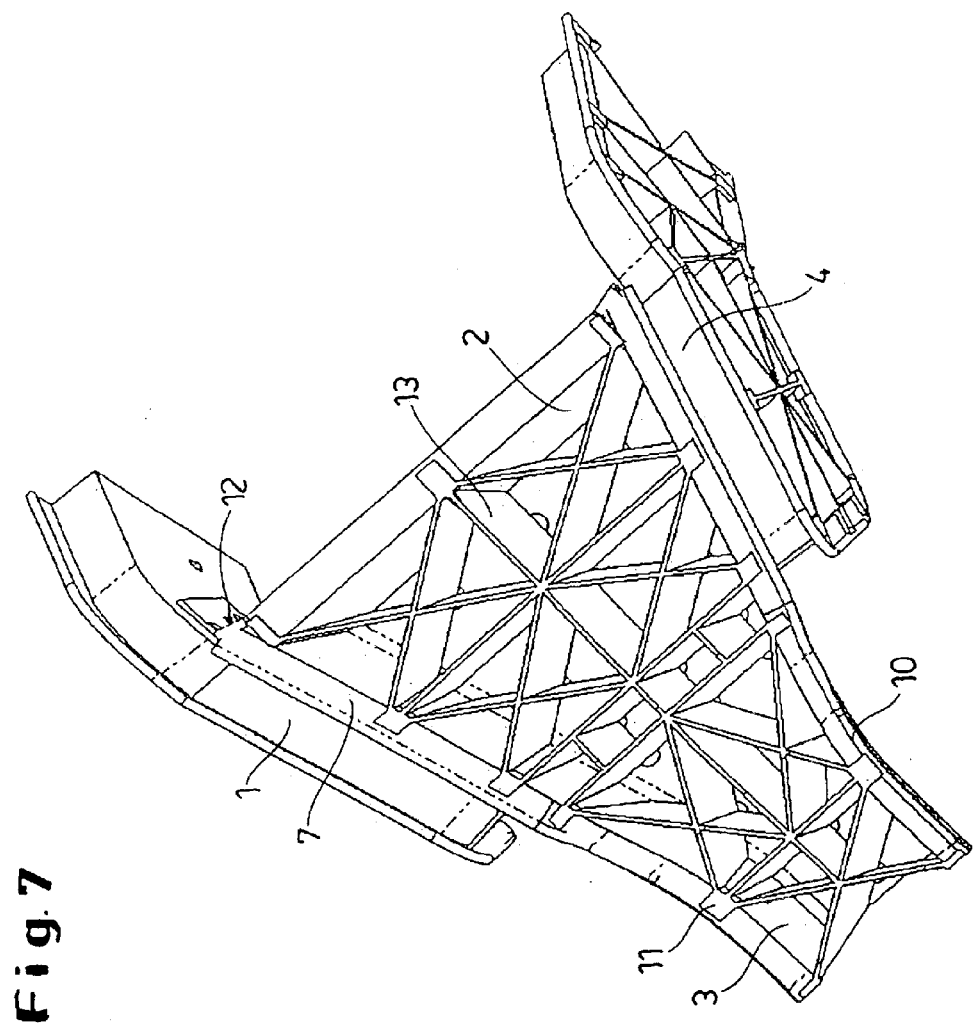
FIG. 7 is a representative perspective view of the composite structural part of FIG. 5 from below, illustrating the interlocking connection of the profiled edge (7) of the profiled section (3) with the lateral profiled sections (1, 4)
Figure 8:
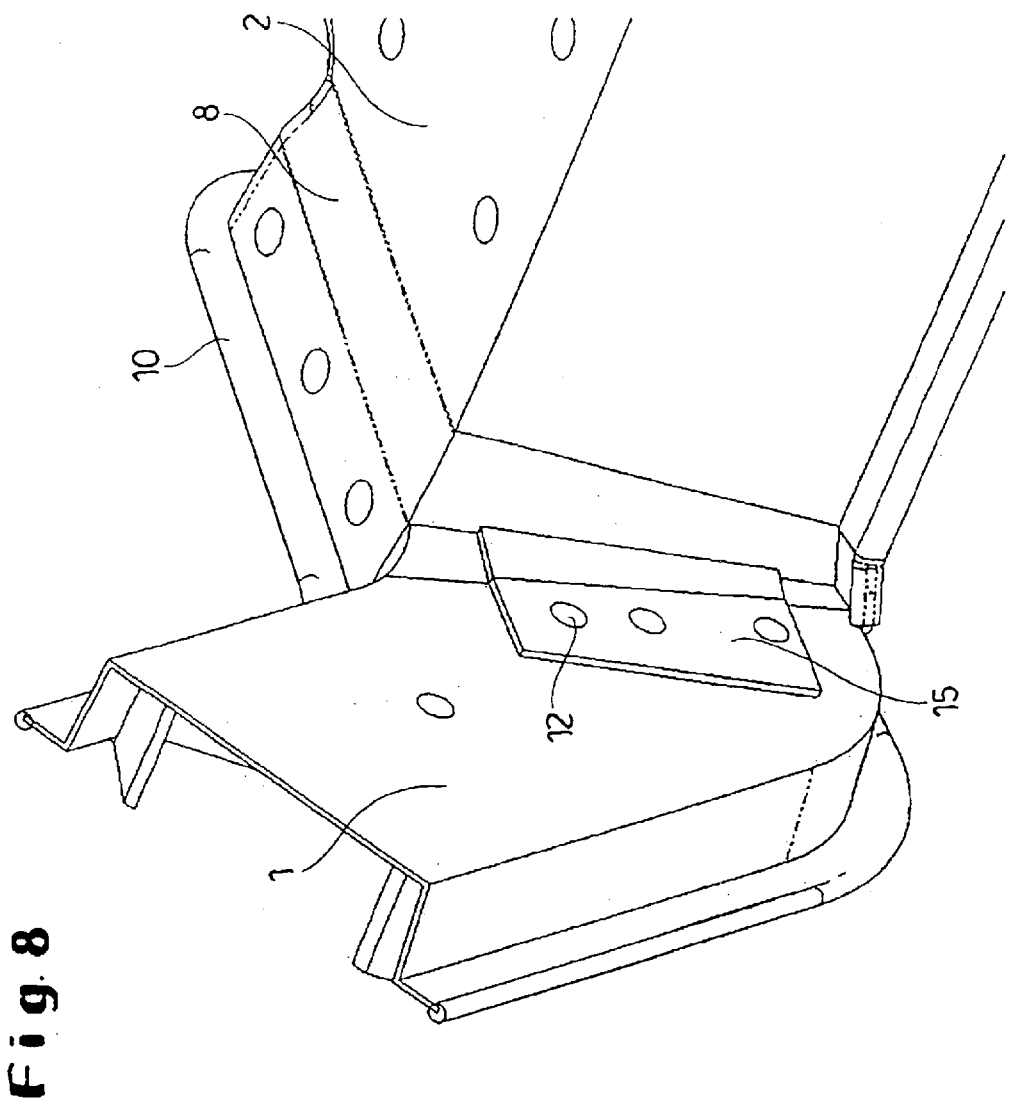
FIG. 8 is a representative perspective view of a portion of the composite structural part according to FIG. 5 from the rear, showing the bracket (15) at the end of the reinforcing element (2)

FIG. 7 shows another view, namely from underneath, of the composite structural part according to FIG. 5. This view again clearly shows the interlocking connection of the profiled edge 7 of the profiled section 3 with the lateral profiled sections 1 and 4. The rib structure 13 of thermoplastic material applied to the third profiled section can also be seen. FIG. 8 is a detail showing how the lateral profiled section 1 is joined to the reinforcing element 2 via the bracket 15 with plastics rivet joints at openings 12.

From the detail in FIG. 9 it can also be seen how the projecting region 5 of the profiled section 1 makes two-dimensional contact with the adjoining profiled section 3.

FIG. 10 shows an overall view of one application of the above-described composite structural part, illustrated by the example of the frame structure of a motor scooter. A stable, high-strength transition from one structural part (profiled section) to two structural parts (profiled section 3) to two structural parts (profiled sections 1 and 4) can be obtained by the symmetrical arrangement of profiled sections 1 and 4 at the end of profiled section 3 (cf. FIG. 10). In addition, use is also made of reinforcing element 2, which strengthens the transition between the single profiled section and the two profiled sections, and of the reinforcing braces 13, which reinforce all of the profiled sections and transitions. By the additional use of profiled sections 16,17, and 18, a complex frame structure is formed. All of the profiled sections have an injection-molded encapsulated profiled edge (10) on their edges, injected-through plastic rivets through holes (12) and rib wraparounds 11. In addition, this example has a cylindrical recess 19 at the top of profiled section 3, which can accommodate the steering column and a widened metal flange 20, which allows the firm fixation of the steering column.

What is claimed is:

1. A composite structural article comprising:
   (a) at least one reinforcing element having sized openings; and
   (b) at least three profiled sections, wherein,
   a portion of each profiled section is connected interlockingly with a portion of said reinforcing element,
   at least two of said profiled sections have terminal portions each having a projecting region that engages interlockingly with the sized openings of said reinforcing element such that a shaped portion of said reinforcing element surrounds at least partially said projecting regions,
   said profiled sections being further joined to said reinforcing element by means of thermoplastic material injected in the region of each interlocking connection with said reinforcing element, and
   one of said profiled sections is in at least one of (i) an abutting relationship with two or more of said profiled sections, and (ii) an interlocking relationship with two or more of said profiled sections.

2. The composite structural article of claim 1 wherein said profiled sections each independently have a cross-sectional configuration selected from closed and open.

3. The composite structural article of claim 2 wherein said profiled sections each independently have a cross-sectional configuration selected from round, rectangular and U-shaped.

4. The composite structural article of claim 1 wherein said reinforcing element is fabricated from a material selected from at least one of metal, ceramics material and high-strength plastics material.

5. The composite structural article of claim 4 wherein the metal is selected from at least one of steel, aluminum, magnesium; and the high-strength plastics material is selected from at least one of thermoplastic materials, long fiber-reinforced plastics materials, and plastics materials that are reinforced with industrial textiles.

6. The composite structural article of claim 1 wherein said reinforcing element is provided with additional reinforcing ribs.

7. The composite structural article of claim 1 wherein the projecting regions of two of said profiled sections are each in two-dimensional abutting contact with a further profiled section.

8. The composite structural article of claim 1 wherein each of said profiled sections independently have a reinforcing edge.

9. The composite structural article of claim 1 wherein each of said profiled sections and said reinforcing element independently have a plastics injection-molded encapsulated edge.

10. The composite structural article of claim 1 wherein each of said profiled sections is arranged in one plane in the region of their interlocking connection with said reinforcing element.

11. The composite structural article of claim 1 wherein one of said profiled sections is a on-piece profiled section, and prior to injection of thermoplastic material into each interlocking connection, said one-piece profiled section is inserted into a sized opening of said reinforcing element, and the projecting regions of each profiled section having a projecting region is inserted into a sized opening of said reinforcing element.

12. The composite structural article of claim 1 wherein the injected thermoplastic material is selected from at least one of (PA), polyester, polyolefins, styrene-acrylonitrile copolymers, polycarbonate (PC), polypropylene oxide (PPO), (PSO), polyphenylene sulfide (PPS), polyimide (PI), (PEE), polyketone, and syndiotactic polystyrene (PS), the thermoplastic material being optionally at least one of reinforced and filled.

13. The composite structural article of claim 12 wherein the thermoplastic polyester is selected from at least one of polyethylene terephthalate (PET) and polybutylene terephthalate (PBT); the thermoplastic polyolefins are selected from at least one of polypropylene (PP) and polyethylene (PE); and the styrene-acrylonitrile copolymer is selected from acrylonitrile-styrene-butadiene copolymers (ABS).

14. The composite structural article of claim 1 comprising a middle profiled section having a profiled edge that is shaped so as to form an additional interlocking connection with at least two other profiled sections.

15. A composite structural article comprising:
   (a) at least one reinforcing element having sized openings; and
   (b) at least three profiled sections, wherein,
   a portion of each profiled section is connected interlockingly with a portion of said reinforcing element,
   at least two of said profiled sections have terminal portions each having a projecting region that engages interlockingly with the sized openings of said reinforcing element such that a shaped portion of said reinforcing element surrounds at least partially said projecting regions,
   said profiled sections being further joined to said reinforcing element by means of thermoplastic material injected in the region of each interlocking connection with said reinforcing element, and
   one of said profiled sections is in at least one of (i) an abutting relationship with two or more of said profiled sections, and (ii) an interlocking relationship with two or more of said profiled sections,
   further wherein,
   said reinforcing element and each of said profiled sections have perforations having edges that are substantially aligned in the region of each interlocking connection of said reinforcing element with each of said profiled sections, and a portion of the thermoplastic material injected in the regions of interlocking connection extends through the substantially aligned perforations, thereby connecting interlockingly each of said profiled sections to said reinforcing element.

16. The composite structural article of claim 15 wherein at least some of said perforations have deformed edge portions.

17. A composite structural article comprising:
   (a) at least one reinforcing element having sized openings; and
   (b) at least three profiled sections, wherein,
   a portion of each profiled section is connected interlockingly with a portion of said reinforcing element,
   at least two of said profiled sections have terminal portions each having a projecting region that engages interlockingly with the sized openings of said reinforcing element such that a shaped portion of said reinforcing element surrounds at least partially said projecting regions, said profiled sections being further joined to said reinforcing element by means of thermoplastic material injected in the region of each interlocking connection with said reinforcing element, and one of said profiled sections is in at least one of (i) an abutting relationship with two or more of said profiled sections, and (ii) an interlocking relationship with two or more of said profiled sections, further wherein, at least one of said reinforcing element and each of said profiled sections have indentations in the region of each interlocking connection of said reinforcing element with each of said profiled sections, the thermoplastic material injected into the region of each interlocking connection filling at least partially said indentations, thereby anchoring the thermoplastic material in the regions of interlocking connection.

18. A composite structural article comprising:

(a) at least one reinforcing element having sized openings; and (b) at least three profiled sections, wherein, a portion of each profiled section is connected interlockingly with a portion of said reinforcing element, at least two of said profiled sections have terminal portions each having a projecting region that engages interlockingly with the sized openings of said reinforcing element such that a shaped portion of said reinforcing element surrounds at least partially said projecting regions, said profiled sections being further joined to said reinforcing element by means of thermoplastic material injected in the region of each interlocking connection with said reinforcing element, and one of said profiled sections is in at least one of (i) an abutting relationship with two or more of said profiled sections, and (ii) an interlocking relationship with two or more of said profiled sections, further wherein, said reinforcing element further comprises at least one bracket, said bracket abutting a portion of at least one profiled section, each of said bracket and the portion of said profiled section abutting said bracket having perforations that are substantially aligned, thermoplastic material being injected into the abutting region of said bracket and said profiled section, the injected thermoplastic material extending through the substantially aligned perforations, thereby connecting interlockingly said profiled sections to said bracket.

* * * * *